Nov. 3, 1964 P. CICIN 3,154,971
INFINITELY VARIABLE MECHANICAL TORQUE CONVERTER
Filed July 23, 1959 16 Sheets-Sheet 2

Nov. 3, 1964   P. CICIN   3,154,971
INFINITELY VARIABLE MECHANICAL TORQUE CONVERTER
Filed July 23, 1959   16 Sheets-Sheet 4

INVENTOR
Paul Cicin
BY
ATTORNEY

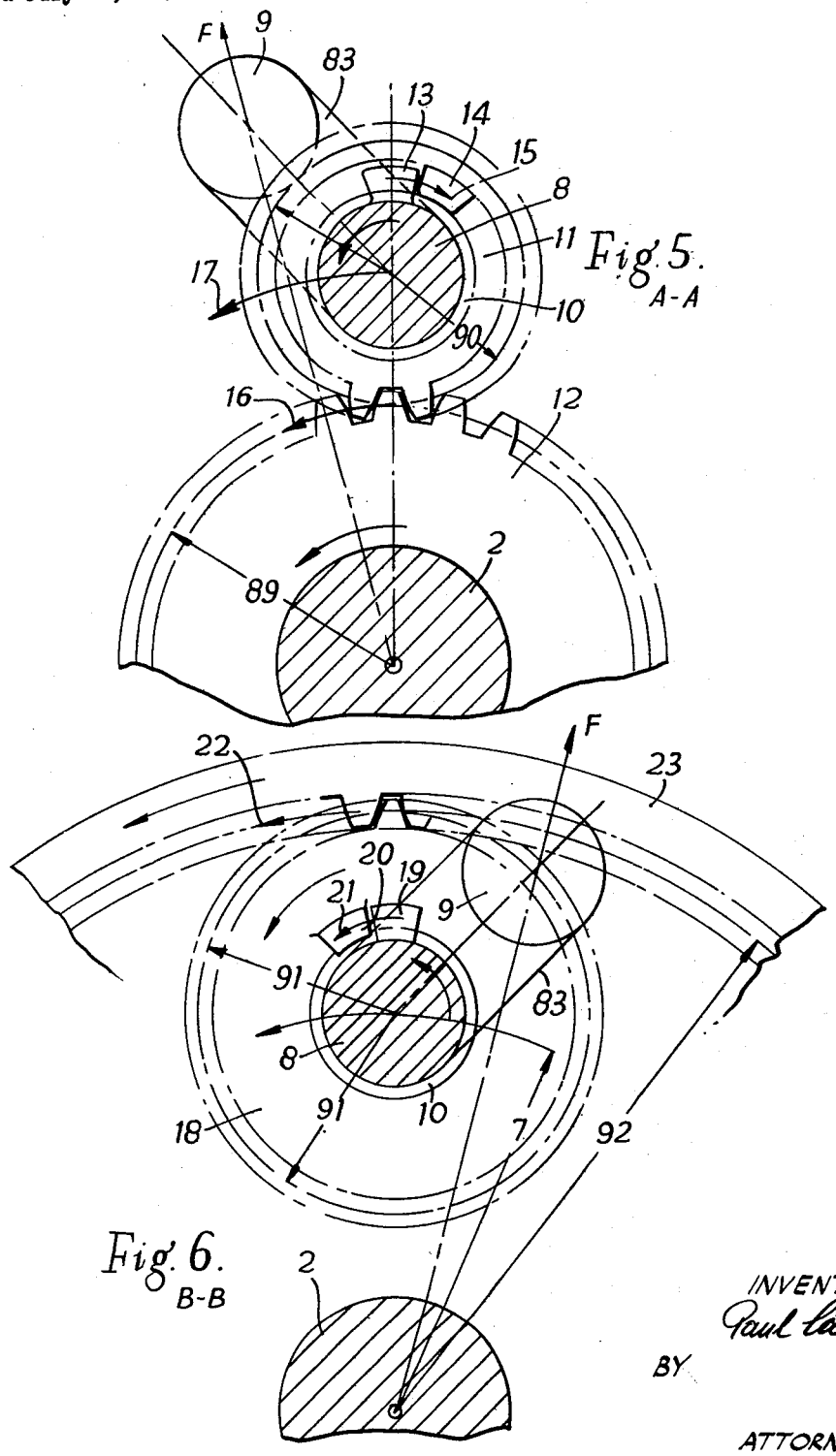

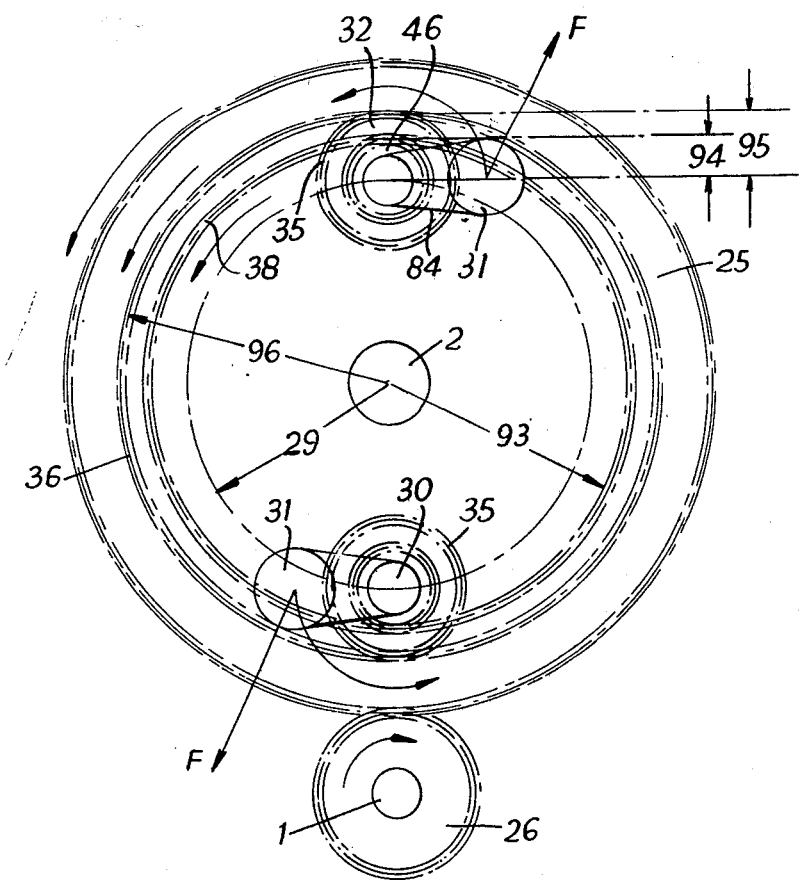

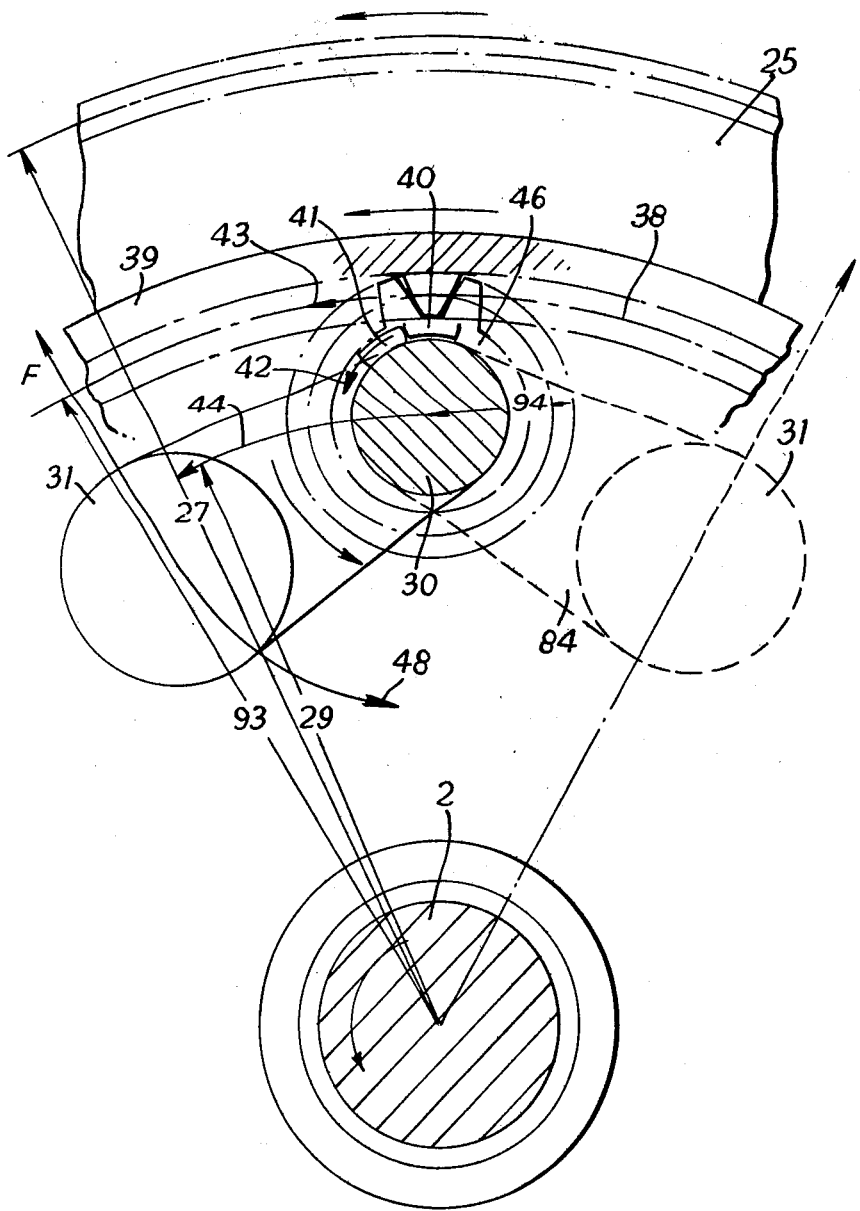

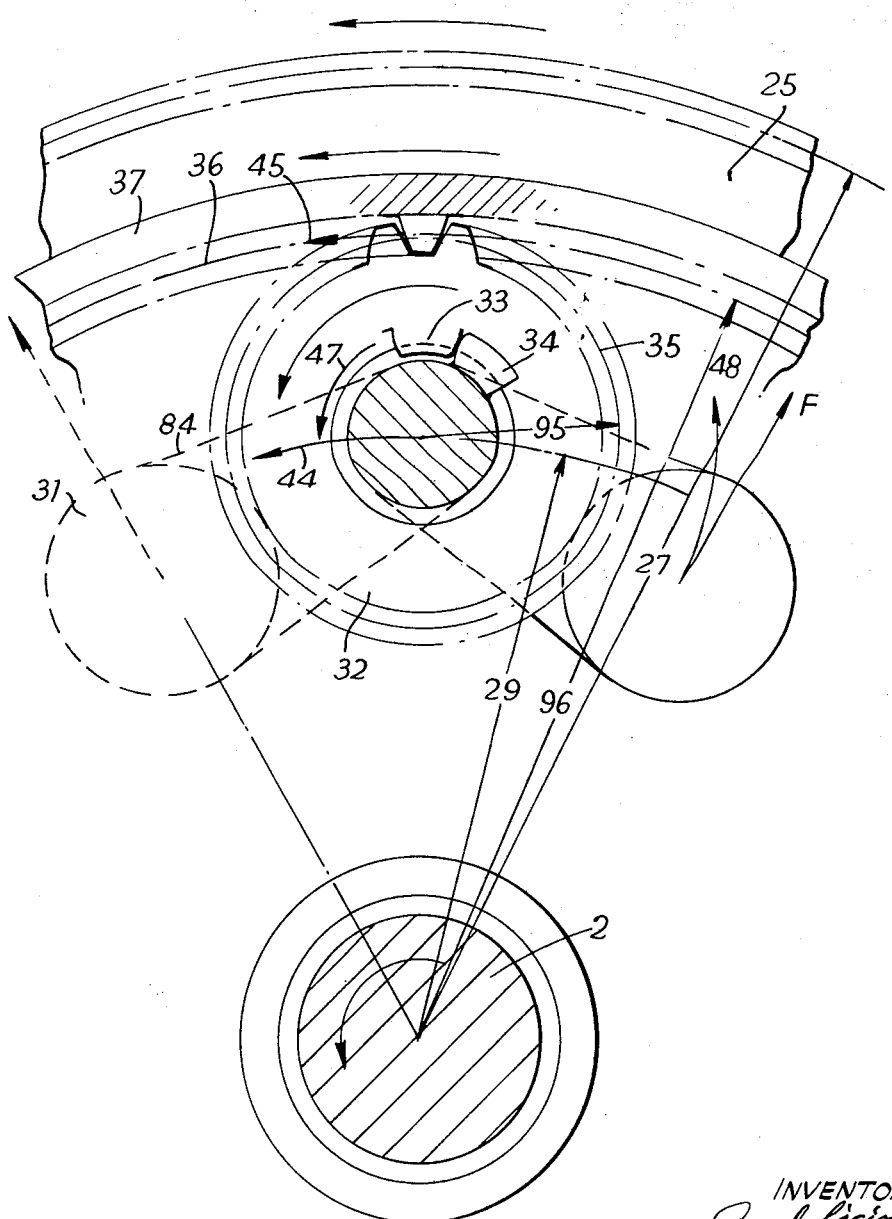

Nov. 3, 1964        P. CICIN        3,154,971
INFINITELY VARIABLE MECHANICAL TORQUE CONVERTER
Filed July 23, 1959        16 Sheets-Sheet 10

E-E

G-G

INVENTOR
Paul Cicin
BY

ATTORNEY

Nov. 3, 1964  P. CICIN  3,154,971
INFINITELY VARIABLE MECHANICAL TORQUE CONVERTER
Filed July 23, 1959  16 Sheets-Sheet 11

$$M = M_{max} \cdot \sin \varphi$$

INVENTOR
Paul Cicin
BY
ATTORNEY

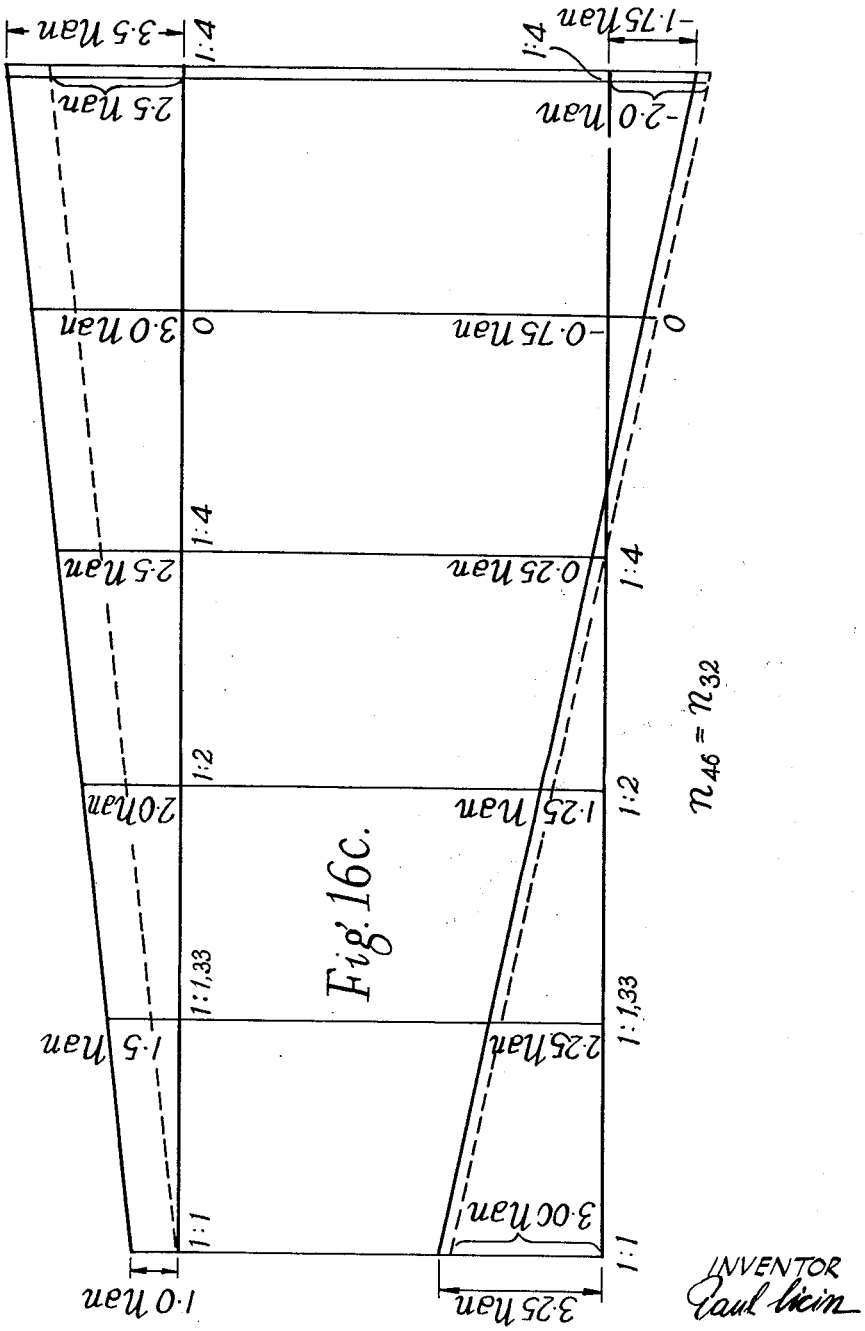

Nov. 3, 1964 P. CICIN 3,154,971
INFINITELY VARIABLE MECHANICAL TORQUE CONVERTER
Filed July 23, 1959 16 Sheets-Sheet 14

INVENTOR
Paul Cicin
BY

ATTORNEY

Nov. 3, 1964 P. CICIN 3,154,971
INFINITELY VARIABLE MECHANICAL TORQUE CONVERTER
Filed July 23, 1959 16 Sheets-Sheet 15

Fig. 18.

INVENTOR
Paul Cicin
BY
ATTORNEY

United States Patent Office 3,154,971
Patented Nov. 3, 1964

3,154,971
INFINITELY VARIABLE MECHANICAL
TORQUE CONVERTER
Paul Cicin, Argentinierstrasse 26, Vienna, Austria
Filed July 23, 1959, Ser. No. 829,150
Claims priority, application Austria, July 24, 1958,
A 5,230/58
11 Claims. (Cl. 74—751)

The present invention relates to an infinitely variable mechanical torque converter, and more particularly to a mechanical torque converter which employs centrifugal weights for obtaining an infinite variation of the torque transmitted from a drive shaft to a driven shaft without the use of friction elements.

Infinitely variable transmissions are known in which the effective radius of friction wheels is varied to obtain a variation of the ratio of the transmission. However, friction transmissions have the disadvantage that the torque is not positively transmitted and that relative slipping of the elements is possible.

Other transmissions are known in which the action of centrifugal weights is used to successively shift the transmission between a number of gear stages. This type of transmission has the disadvantage that an infinite variation of the torque is not possible so that the ratio of the transmission is stepwise changed.

Other known transmissions transform a rotary motion into an oscillating motion, which is varied, and then again transformed into a rotary motion. This type of transmission has the disadvantage that the elements of the transmission have to be accelerated and decelerated during the operation resulting in considerable wear and tear of the parts.

It is the object of the present invention to overcome the disadvantages of the variable transmissions according to the prior art, and to provide an infinitely variable mechanical torque converter in which the torque is positively transmitted.

Another object of the present invention is to provide a mechanical torque converter having no oscillating parts and friction elements.

A further object of the present invention is to provide a mechanical torque converter which is capable to automatically vary the torque transmitted from a drive shaft to a driven shaft in accordance with the load torque acting on the driven shaft.

It is still an object of the present invention to provide an infinitely variable mechanical torque converter controlled by centrifugal weights to continuously vary its ratio.

With these objects in view, the present invention mainly consists in an infinitely variable mechanical torque converter which comprises a drive shaft, a driven shaft, a first epicyclic gear unit and a second epicyclic gear unit, and differential transmission means operatively connecting the two units. Each epicyclic gear unit includes gear means, for example a sun gear and an orbit gear, or two orbit gears, rotary planetary carrier means driven from the drive shaft, planetary shaft means mounted on the carrier means for rotation and including centrifugal weight means, planetary gears turnably mounted on the planetary shaft means and meshing with said gear means, and coupling means for coupling the shaft means to the planetary gears during turning movement in one direction. The coupling means include at least one coupling projection on the planetary shaft means, and at least one coupling projection on the gear means. The coupling projections abut each other during rotation of the carrier means due to the action of the centrifugal force on the weight means.

In addition to the planetary carrier means of the two units, a rotary transmission member of the intermediate differential transmission means is operatively connected to the drive shaft and driven from the same.

In this manner, the torque transmitted from the drive shaft to the driven shaft is varied in accordance with a load torque acting on the driven shaft. Potential energy is stored in the centrifugal weight means during inward movement of the same, while kinetic energy is released during movement of the centrifugal weight means in outward direction.

In a preferred embodiment of the present invention, the intermediate differential transmission means includes first and second worm wheels respectively connected to the output gear of the first unit and to the input gear of the second unit for rotation therewith; first and second worm screws turnably mounted on the transmission member, which is preferably a casing provided with gear teeth; and gear means connecting the worm screws for rotation.

The ratios between the rotary speed of the drive shaft, and the rotary speeds of the two carrier means of the two units are different. For example, in one embodiment of the present invention, the ratio between the rotary speed of the drive shaft and the rotary speed of the carrier means of the first unit is 1:1, while the ratio between the rotary speed of the drive shaft and the rotary speed of the carrier means of the second unit is 1:4. During the operation, the ratio of the transmission is infinitely varied between these two ratios.

Due to the driving connection between the intermediate differential transmission means and the drive shaft, the differential transmission means is capable of receiving additional energy, which is stored by the centrifugal weights of the units, or to return an excess energy of the two units to the drive shaft.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 5 is a fragmentary cross sectional view taken on line A—A in FIG. 4;

FIG. 6 is a fragmentary cross sectional view taken on line B—B in FIG. 4;

FIGS. 7 and 8 are fragmentary end views illustrating different operational positions of the second epicyclic gear unit shown in FIG. 1;

FIG. 10 is a fragmentary cross sectional view on an enlarged scale taken on line C—C in FIG. 9;

FIG. 11 is a fragmentary cross sectional view corresponding to FIG. 11 and illustrating another operational position;

FIGS. 16, 16b and 16c are diagrams illustrating in graphical representation the speed variation of the drive shaft while connected to a driven shaft by the transmissions of the present invention;

FIG. 16a is a diagram illustrating the speed variations of the driven shaft;

FIG. 18 is an axial sectional view illustrating an infinitely variable mechanical transmission according to another embodiment of the present invention.

Figure 1:
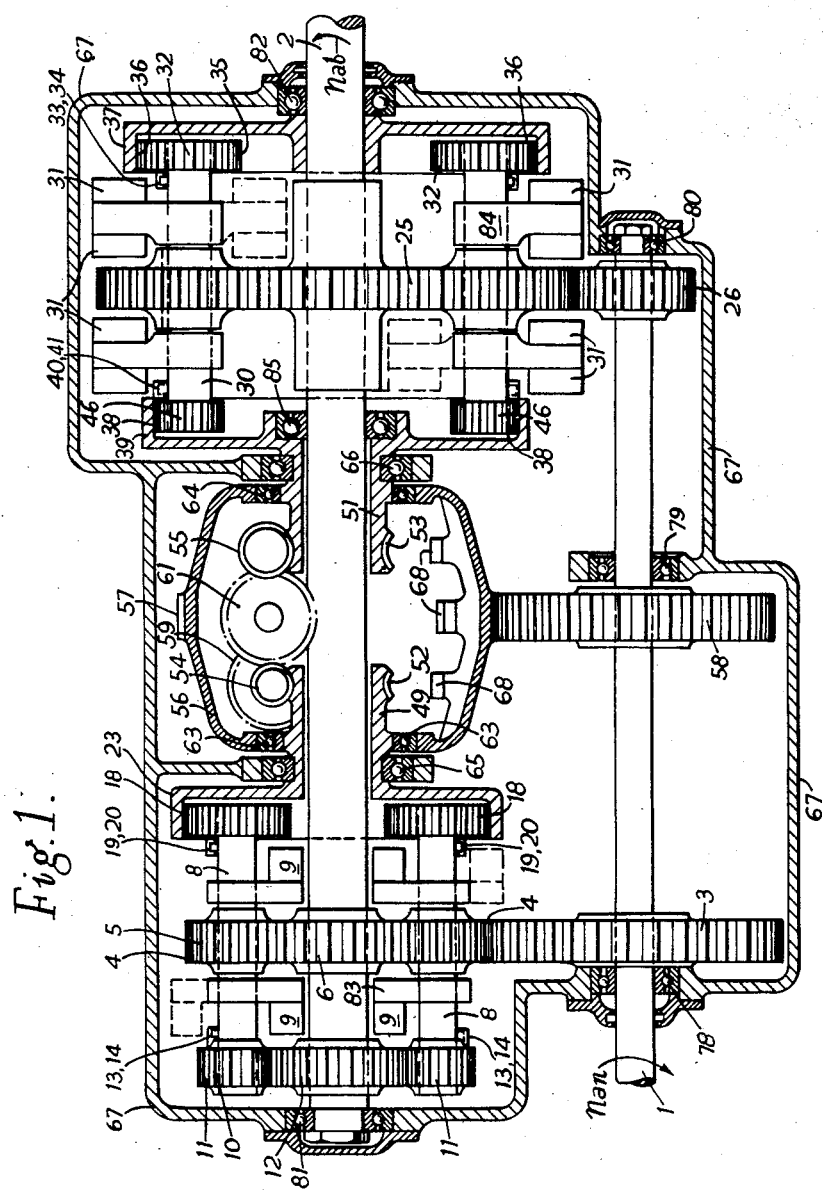
FIG. 1 is a longitudinal sectional view illustrating one embodiment of a torque converter according to the present invention.

Referring now to the drawings, and more particularly to FIG. 1, a drive shaft 1 is arranged parallel to a driven shaft 2. A spur gear 3 is fixed on shaft 1 and meshes with gear teeth 4 on a planetary carrier means 5 of a first epicyclic unit which is shown on the left of FIG. 1. Another spur gear 58 is fixed to drive shaft 1 and meshes with the gear teeth 57 of a casing 56 of an intermediate differential transmission means which connects the epicyclic gear unit on the left of FIG. 1 with the epicyclic gear unit on the right of FIG. 1. The second epicyclic unit has a planetary carrier means 25 provided with gear teeth meshing with a gear 26 which is also fixed to the drive shaft 1. In the embodiment illustrated in FIG. 1, the ratio of transmission between gears 3 and 4, and gears 58 and 57 is 1:1, and the ratio of transmission between gear 26 and the planetary carrier means 25 is 1:4.

Drive shaft 1 is turnably mounted in bearings 78, 79 and 80 supported by a housing 67.

Driven shaft 2 is mounted in bearings 81 and 82.

Referring now to the first epicyclic gear unit shown on the left of FIG. 1, two planetary shaft means 8 are turnably mounted in the planetary carrier means 5. Fixed to each shaft means 8, are a pair of centrifugal weights 9 which are eccentrically supported by crank portions 83. Planetary spur gears 11 are turnably mounted on shafts 8 and mesh with a sun gear 12 fixed on driven shaft 2. Another pair of planetary gears 18 are turnably mounted on the other ends of planetary shafts 8 and mesh with the internal orbit gear 23. A hollow shaft 49 is secured to orbit gear 23, and rotatably supported in bearing 65.

Figure 4:
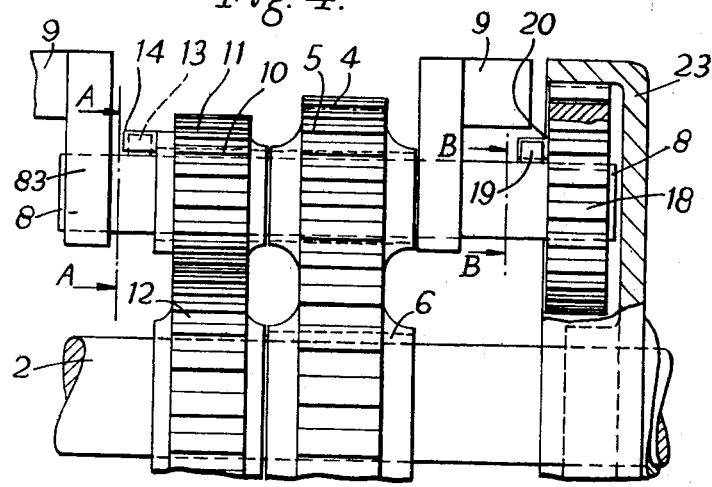
FIG. 4 is a fragmentary side view illustrating a detail of FIG. 1 on an enlarged scale.

As also shown in FIGS. 4 and 5, a dog couhling is provided between planetary gears 11 and shafts 8. Planetary gears 11 run on bearings 10 on shafts 8. As best seen in FIGS. 4 and 6, a dog coupling is provided between shafts 8 and planetary gears 18. The dog coupling of the planetary gears 11 includes a coupling projection 13 fixed on shaft 8, and a coupling projection 14 fixed on gear 11. The other dog couplings include a coupling projection 19 on shafts 8, and a coupling projection 20 on planetary gear 18. The action of the centrifugal weights 9 on shafts 8 urge the coupling projections against each other and it will be understood that coupling between the elements takes place only in one direction of rotation. When the dog couplings 19, 20 couple planetary gears 18 to shafts 8, torque is transmitted from the first epicyclic gear unit to the intermediate differential transmission by shaft 49.

Figure 2:
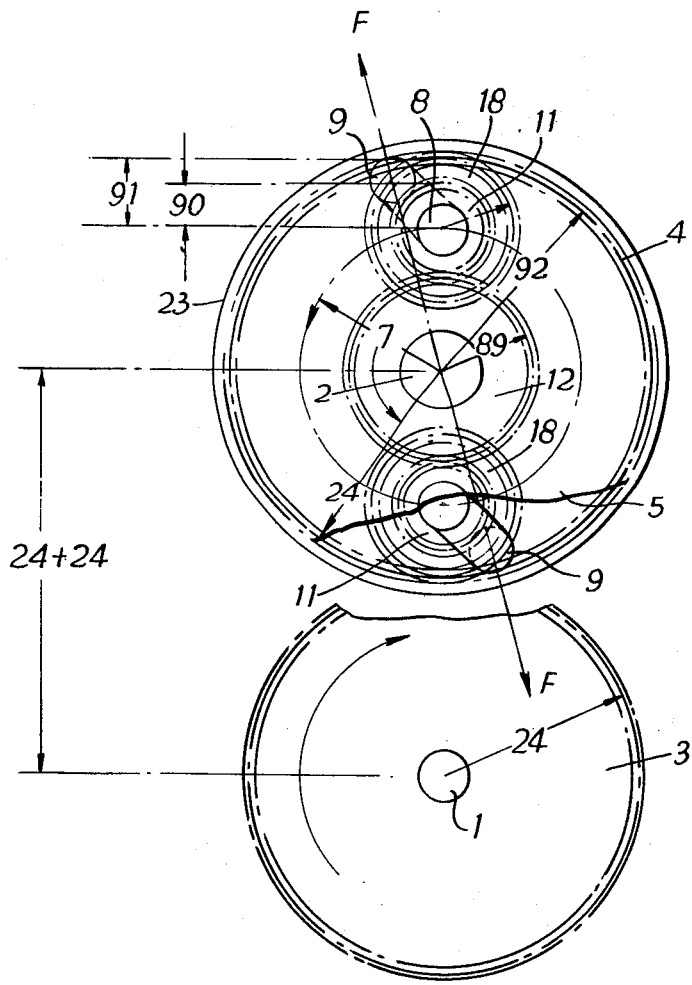
FIGS. 2 and 3 are fragmentary schematic cross sectional views illustrating two different operational positions of the centrifugal weights.

FIGS. 2 and 5 illustrate the positions of the elements during a driving phase. The centrifugal weight 9 moves opposite to the action of the centrifugal force F so that coupling projection 13 of shaft 8 is pressed in direction of arrow 15 against coupling projection 14 on gear 11 so that a force 16 acts on the teeth of sun gear 12 acting in the direction of rotation 17 of carrier means 5 so that a torque is transmitted to driven shaft 2.

Figure 3:
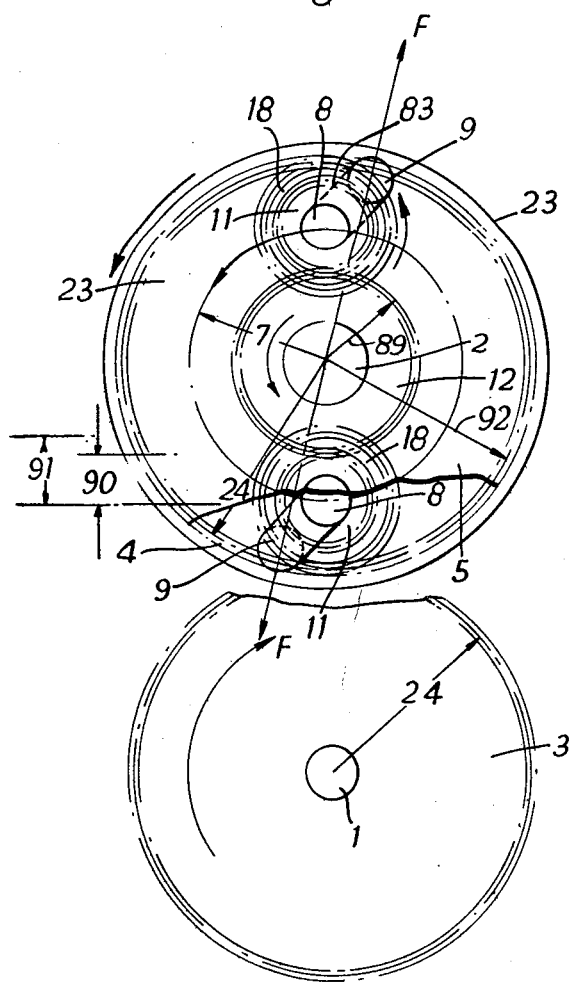

In the operational phase illustrated in FIGS. 3 and 6, centrifugal weights 9 move in outward direction corresponding to the action of the centrifugal force F. The coupling projection 19 of shaft 8 is pressed against coupling projection 20 of gear 18 due to the action of the centrifugal force, and transmits a pressure 21 acting in counterclockwise direction to the gear 18, which on the other hand transmits the force 22 to the teeth of the internal orbit gear 23 so that the same is driven in counterclockwise direction. This energy is transmitted to the intermediate differential transmission, and from there to the second epicyclic unit where the energy is used for retracting the centrifugal weights 31 in inward direction whereby energy is stored, as will be described hereinafter in greater detail.

Figure 9:
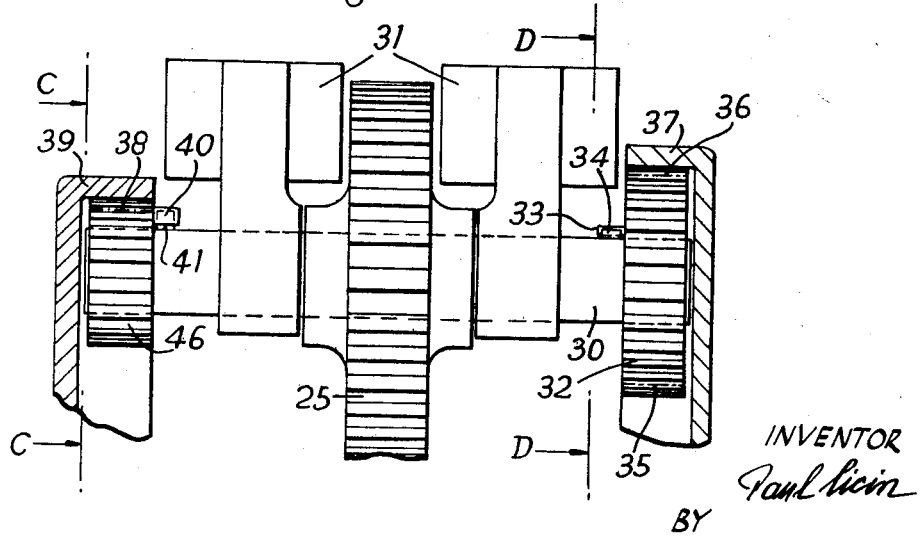
FIG. 9 is a fragmentary view, partly in section, of a detail of the second epicyclic unit shown on an enlarged scale.
Figure 7:
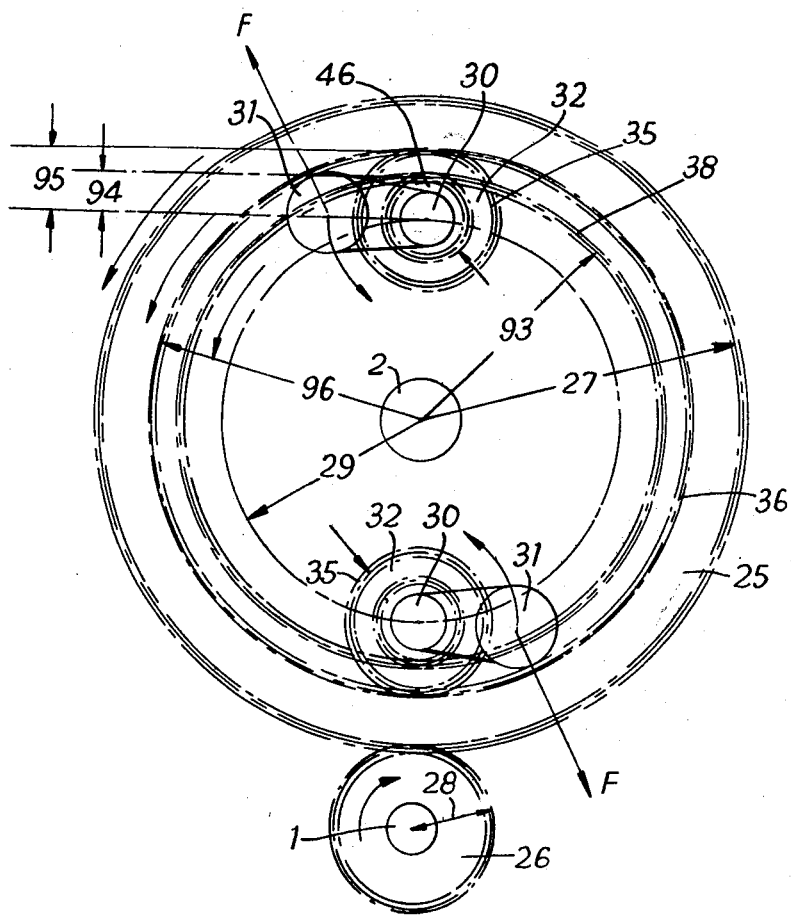
Figure 13:
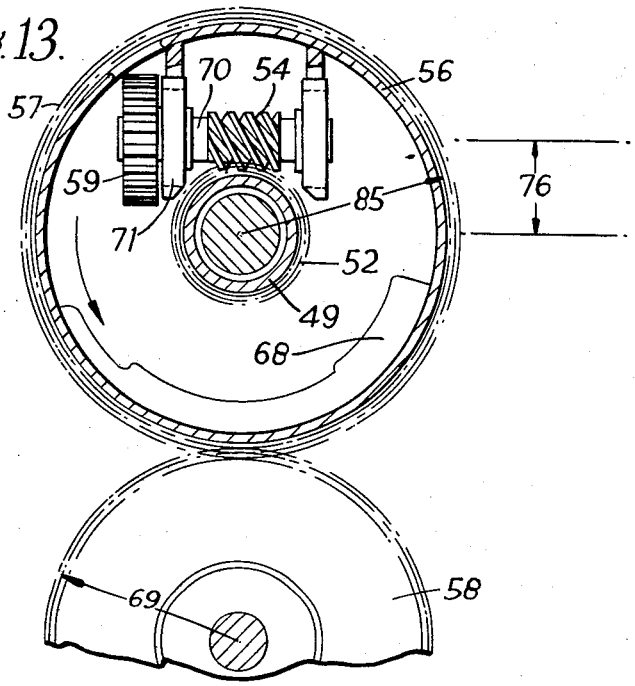
FIG. 13 is a fragmentary cross sectional view taken on line E—E in FIG. 12.
Figure 14:
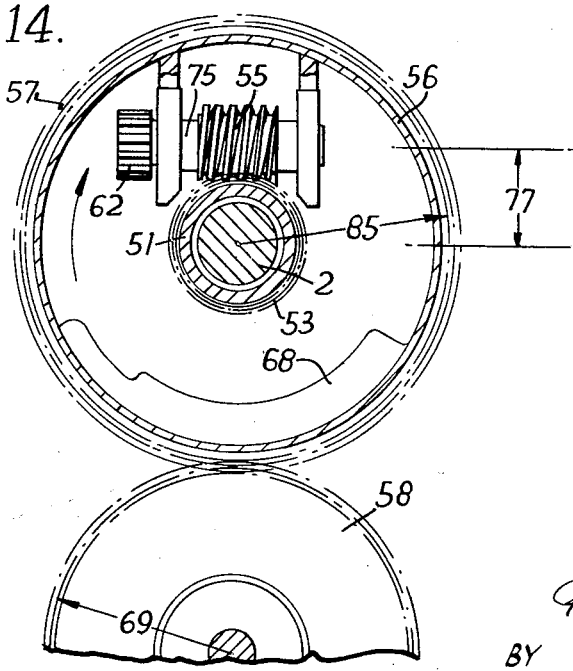
FIG. 14 is a fragmentary cross sectional view taken on line G—G in FIG. 12.
Figure 12:
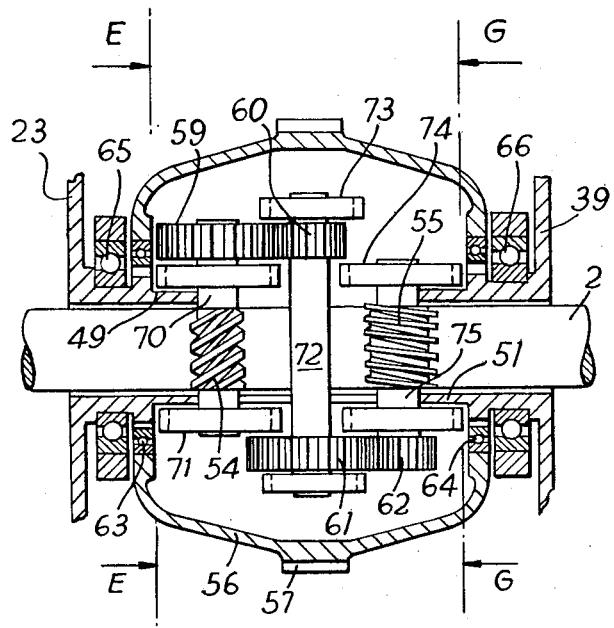
FIG. 12 is an axial sectional view illustrating the intermediate differential transmission means of the present invention.
Figure 15:
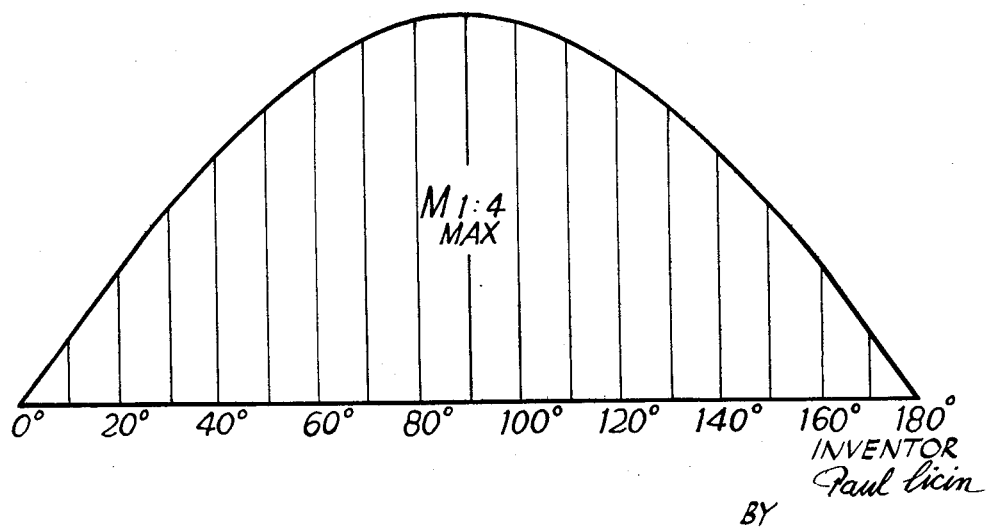
FIG. 15 is a graph illustrating the variation of the torque during the operation of the transmission.

As shown in FIG. 1, and also in FIGS. 7, 8 and 9, the second epicyclic gear unit includes the planetary carrier means 25 whose gear teeth have a pitch circle whose radius is four times the radius 28 of gear 26. Two diametrically arranged planetary shafts 30 including centrifugal weights 31 are turnably mounted on the planetary carrier means 25. The axes of shafts 30 are spaced the radius 29 from the axis of driven shaft 2. Planetary spur gears 32 are freely turnably mounted on shafts 30 and connected to the same in one direction of rotation only by dog couplings including coupling projections 33 on gears 32 and on shafts 30. The gear teeth 36 of gears 32 mesh with an internal orbit gear 37 which is fixed to driven shaft 2. Planetary gears 46 are freely turnable on the other ends of shafts 30, and mesh with the internal teeth of orbit gear 39. A dog coupling including a projection 41 on shafts 30 and a projection 40 on planetary gears 38 connects shafts 30 to their respective gears 38 for rotation in one direction only.

In the operational phase shown in FIGS. 8 and 11, the centrifugal weights 31 move in the direction 48 of the centrifugal force F so that the coupling projection 34 of shaft 30 is pressed against coupling projection 33 on the planetary gear 32 and produces the force 45 on the teeth of the internal gear 37 so that a torque is transmitted to the driven shaft 2.

In the following operational phase in which energy is stored in the centrifugal weights 31, illustrated in FIG. 7, the centrifugal weights 31 move in inward direction as indicated by the arrow 48 and against the action of the centrifugal force F, while, as best seen in FIG. 10, the internal gear 39, driven in counterclockwise direction from the intermediate differential transmission, exerts a force 43 on the teeth of planetary gears 46 so that planetary gear 46 transmits a force 42 through coupling projection 40 acting in counterclockwise direction on coupling projection 41 so that a torque is transmitted to the planetary shafts 30. Consequently, the centrifugal weights 31 are moved in direction of the arrow 48 in inward direction, so that potential energy is stored in the centrifugal weights 31. This energy is transformed into kinetic energy during a following operational phase shown in FIGS. 8 and 11, during which energy is transmitted to the driven shift for driving the same. The first and second epicyclic gear units are connected by the intermediate differential transmission means which will now be described with reference to FIGS. 1, 12, 13 and 14. As explained above, the internal gear 23 of the first unit, has a tubular extension 49 projecting into casing 56. The internal gear 39 of the second unit has a corresponding tubular extension 51 constituting a hollow shaft turnably mounted in bearing 66. The casing 56 is mounted by bearings 63 and 64 on the hollow shafts 49 and 51, and can be turned through gears 57 and 58 from drive shaft 1.

The ends of shafts 49 and 51 are provided with worm wheels 52 and 53 meshing with worm screws 54 and 55 which are turnably mounted in casing 56. Worm screw 54 has a steep pitch angle, while worm screw 55 has a small pitch angle.

Shaft 70 of worm screw 54 is turnably mounted in bearings 71, and shaft 75 of worm screw 55 is turnably mounted in bearings 74. A central shaft 72 is turnably mounted in bearings 73 and carries gears 60 and 61 meshing with gears 59 and 62 which are fixed to shafts 70 and 75, respectively. Consequently the two worm screws are connected for rotation by gear means. It will be noted that the worm screws 54 and 55 have left handed thread and right handed thread, respectively. Since worm screws 54 and 55 turn in the same direction, worm wheels 52 and 53 will turn in opposite directions of rotation. The same result can be obtained by using worm screws which both have right handed, or left handed, thread, but connected by gear means for turning movement in opposite directions.

The worm wheel 53 must turn slower, as worm wheel 52 turns faster. Since the pitch angles of the two worm screws have to be different for reasons which will be explained hereinafter, the ratio of the gear means 59, 60, 61, 62 is so chosen that worm screw 55 turns faster than worm screw 54 so that worm wheels 52 and 53 are rotated at the same speed, but in opposite directions.

In the construction shown in FIG. 1, the worm screws and gear means connecting the same are arranged only on one side of the axis of rotation, requiring the provision of counterbalancing masses 68 on the other side of the axis. In a modified arrangement a second set of worm screws 54 and 55, and gear means 59 to 62, and including a shaft 72 and bearings 71, 73 and 74 may be provided instead of the counterbalancing masses 68 to counterbalance the intermediate differential transmission. The second set of worm screws 54 and 55 meshes, of course, with the worm wheels 52 and 53.

Instead of the dog couplings illustrated and described with reference to FIGS. 1 to 11, screw couplings, or similar couplings can be used in the arrangement of the present invention, as long as such couplings permit limited turning movement of the planetary shaft with the centrifugal weights, and effect a positive coupling between the planetary shafts and the respective planetary gears. The shape and the arrangement of the centrifugal weights on the planetary shaft can also be modified, as will be apparent to those skilled in the art.

A jerky transmission of forces by the dog couplings cannot take place, since the dog couplings are positively connected into the transmission in both directions of transmission of force. In each of the two epicyclic units, the effect of one dog coupling, for example 13, 14, is opposite to the effect of the other dog coupling, for example 19, 20 so that whenever the coupling projections of one dog coupling tend to separate, the other dog coupling prevents such separation.

Figure 17:
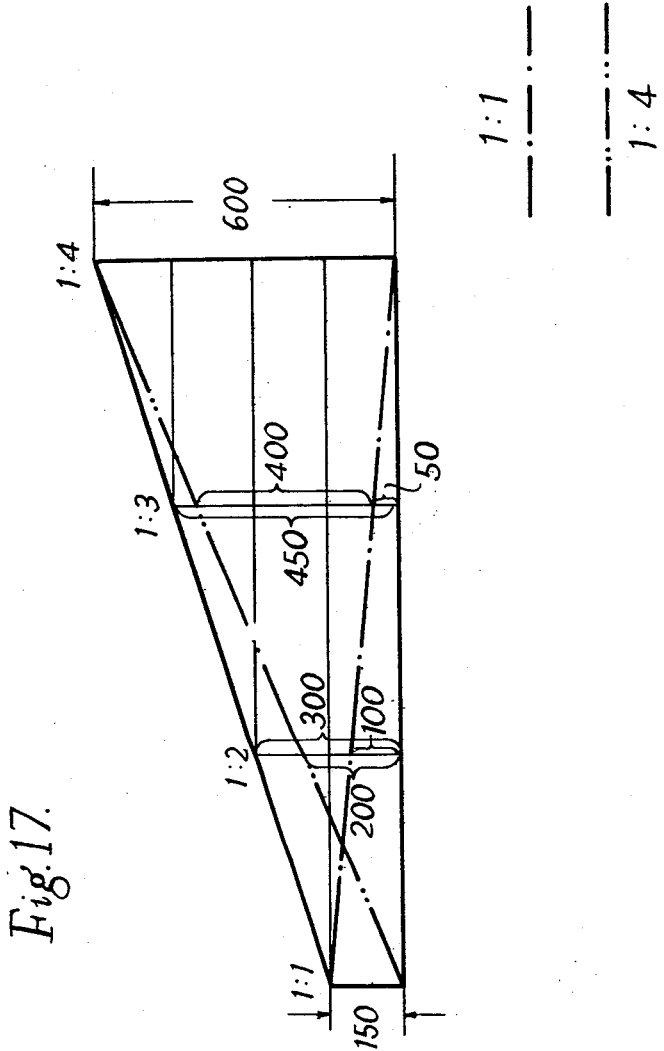
FIG. 17 is a graphical illustration of the forces exerted by the drive shaft on the carrier means of the two units.

FIG. 17 illustrates the linear distribution of the forces produced by the drive shaft on the gear teeth of carrier means 5 and 25 of the two epicyclic units. Conditions are assumed in which the torque is converted in the range between the transmission ratios 1:1 and 1:4. The dash and dot line illustrates the tooth pressure for the first unit having the ratio 1:1, and the double dotted line illustrates the tooth pressure for the second unit having the ratio 1:4.

In the event that the rotary speed of the driven shaft corresponds to the rotary speed of one of the carrier means 5 or 25, the centrifugal weights of the epicyclic unit do not turn relative to the respective planetary carrier means. The centrifugal weights only assume such a position that the centrifugal force produced by the rotation of the carrier means on the centrifugal weights, acts through a corresponding lever arm to produce the torque to be transmitted to the driven shaft 2. In the other epicyclic unit, the centrifugal weights carry out a turning movement relative to the carrier means, however, no torque is transmitted in this particular condition to the drive shaft by the respective epicyclic unit alone.

The conditions are reversed, if the other epicyclic unit has a carrier means rotating at the rotary speed of the driven shaft. In this event, only the other epicyclic unit transmits the torque at the respective transmission ratio.

In all other torque and load conditions, the energy is transmitted from the drive shaft through both epicyclic units and through the differential transmission in such a manner that the sum of the output torques corresponds to the torque acting on the driven shaft. Such output torque is automatically varied to correspond to the load torque acting on the driven shaft.

Due to the provision of the dog couplings according to the present invention, the centrifugal weight means act either in the direction of the centrifugal force, or in opposite direction, to transmit energy to the driven shaft, while in the idling phase, the second part of the energy is transmitted through the intermediate differential transmission to the other epicyclic unit and either utilized in the same or partly or completely returned to the drive shaft.

If the centrifugal weights were fixedly connected with the gears driving the driven shaft, only a small part of the energy could be transmitted, since a transmission of energy during motion of the centrifugal weights in the direction of the centrifugal force, would be compensated by the opposite energy during the motion phase opposite to the direction of the action of the centrifugal force.

In accordance with the present invention, the reaction force during motion of the centrifugal weights in one epicyclic unit in inward direction is used for driving the driven shaft, and the energy simultaneously stored is used together with the energy introduced into the intermediate differential transmission, to move the centrifugal weights in the second epicyclic unit in inward direction against the action of the centrifugal force to store energy for the following motion phase in direction of the centrifugal force.

In the range of transmission between the ratios of transmission of the two epicyclic units, the relative angular velocity of the centrifugal weights with respect to the carrier means, is the greater in one of the units the smaller the relative angular velocity in the other unit is. Consequently, a reversal of the velocity is necessary during transfer from one unit to the other unit. Such reversal is carried out in the intermediate differential transmission using the uniform rotation of the drive shaft, gears 58 and 57, which is superimposed on the rotary motion produced by the first epicyclic unit through hollow shaft 49 and worm wheel 52. The superimposing of such rotary motions in the intermediate differential transmission effects the reversal required for the actuation of the centrifugal weights in the second epicyclic unit. Simultaneously with the transformation of the rotary speed, energy is taken from the drive shaft, and transmitted from the rotary transmission member 56 of the intermediate differential transmission to the respective epicyclic unit.

The energy can be also transmitted from the drive shaft to the driven shaft when the rotary speed of the driven shaft is smaller than the rotary speed of the carriers of the two epicyclic units. In this event, the transmission of the energy in the two units takes place during a motion phase in which the centrifugal weights move opposite to the direction of centrifugal force, while in the following motion phase, in which the centrifugal weights move in the direction of centrifugal force, the released potential energy is returned through the intermediate differential transmission to the drive shaft. Consequently, during the drive phase, energy is available which may be temporarily greater than the constant energy supplied by a motor to the drive shaft.

Energy can also be transmitted from the drive shaft to the driven shaft when the rotary speed of the driven shaft is greater than the rotary speed of the planetary carrier means 5 and 25 of the two epicyclic units. In this case, the energy is transmitted from the two units to the driven shaft during a motion phase during which the centrifugal weights move in the direction of centrifugal force in outward direction, while in the following motion phase in which the centrifugal weights move in inward direction, the required energy is provided by the drive shaft through the intermediate differential transmission.

In FIGS. 16, 16a, 16b and 16c, the number of revolutions per time unit of different elements of the transmission are shown in relation to the respective prevailing ratio of transmission, and rotary speed of the driven shaft. The number of revolutions is indicated by the character $n$, while an index is added corresponding to the respective gear or part which moves at the respective rotary speed.

$n_{an}$ is the rotary speed of the drive shaft and $n_{ab}$ is the rotary speed of the driven shaft. Consequently $n_{an}=n_3=n_{58}=n_5=n_{26}$ because the respective gears are fixedly connected to the drive shaft, or driven at a ratio 1:1.

Correspondingly, $n_{ab}=n_{12}=n_{37}=n_2$ because gear 12 and internal gear 37 are fixed on the driven shaft 2. When the driven shaft 2 is at a standstill, $n_{ab}=0$. When the drive shaft rotates at the speed $n_{an}$, the other parts fixedly mounted thereon rotate at the same speed. The carrier 5 of the first epicyclic unit rotates at the rotary speed $n_5$ in counterclockwise direction, when the drive shaft 1 rotates in clockwise direction. The number of revolutions, or the rotary speed, of the planetary gears 11 and 18 can be determined by the equation:

$$n_{11}=n_{18}=n_5 \cdot \left(1+\frac{r_1}{r_2}\right)-n_{12} \cdot \frac{r_1}{r_2} \quad (1)$$

In this equation, $r_1$ is the radius of the pitch circle of sun gear 12, and $r_2$ is the radius of the pitch circle of the planetary gears 11.

$$\frac{r_1}{r_2}=\frac{r_{12}}{r_{11}}=2$$

in the illustrated embodiment. When the driven shaft is at a standstill, $n_{ab}=0$, and $n_{11}=n_{18}=3.n_{an}$ when the conditions illustrated in FIG. 16b prevail. $n_{25}=0.25.n_{an}$ in the second epicyclic gear unit, and the ratio of the radii of the pitch circles is:

$$\frac{r_1}{r_2}=\frac{r_{36}}{r_{32}}=4.0$$

The rotary speed $n_{32}=n_{46}$ of the planetary gears can be determined by the equation:

$$n_{32}=n_{46}=n_{25} \cdot \left(1-\frac{r_1}{r_2}\right)+n \cdot \frac{r_1}{r_2} \quad (2)$$

$n_{25}=0.25.n_{an}$, in the event that $n_{ab}=0$, $$n_{32}=n_{46}=0.25 \cdot n_{an} \cdot (1-4)=-\frac{3}{4} \cdot n_{an}=-0.75 \cdot n_{an}$$

which corresponds to the conditions illustrated in FIG. 16c.

The rotary speed of the internal gear 23 in the event that the driven shaft is at a standstill can be determined by Equation 2. The ratio of the radii of the pitch circles is $$\frac{r_1}{r_2}=\frac{r_{23}}{r_{18}}=3.0$$

Figures 16, 16A:
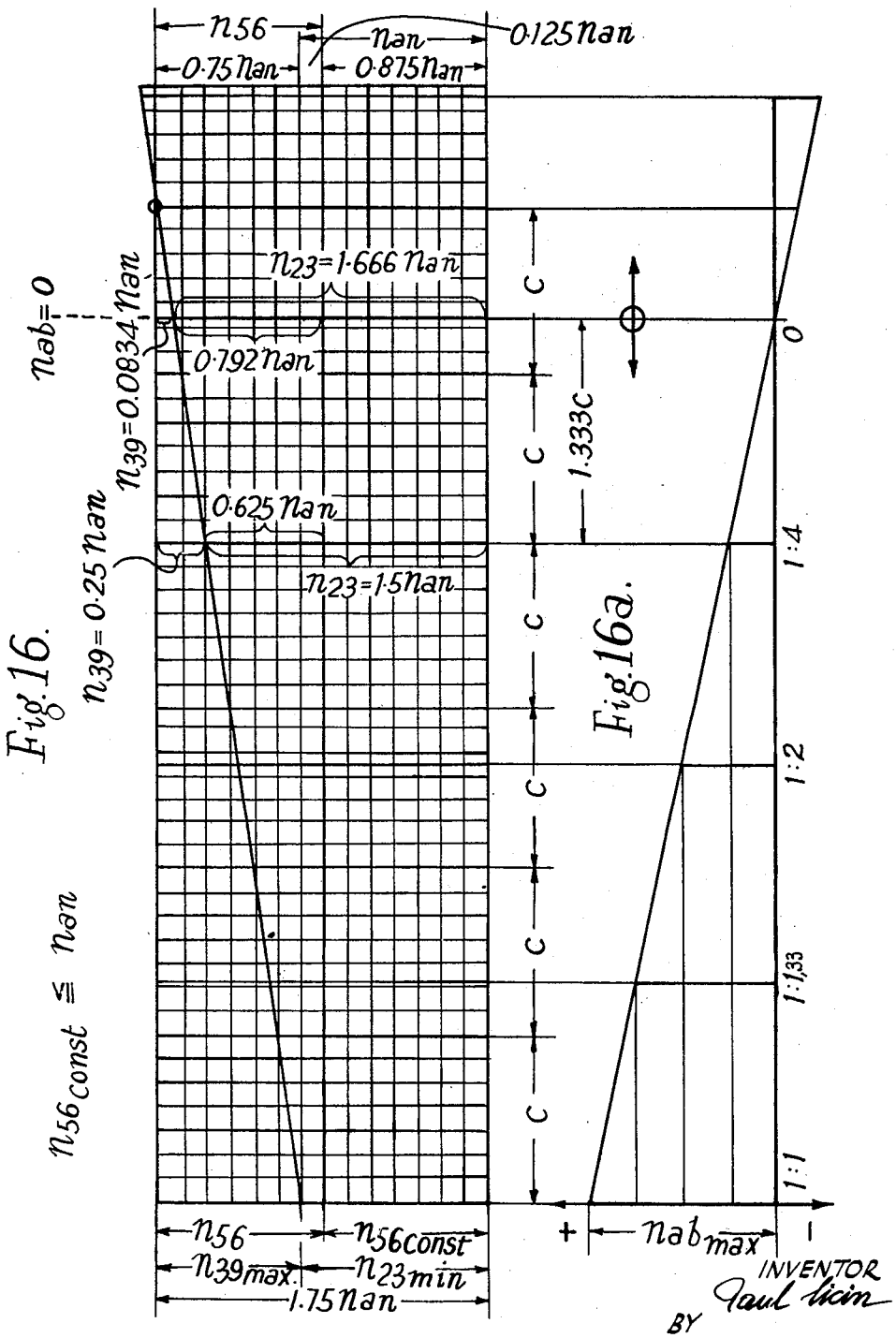

Therefrom follows that $n_{18}=3.n_{an}=-2.n_{an}+3.n_{23}$ and $n_{23}=1.666.n_{an}$ corresponding to the conditions illustrated in FIG. 16.

The rotary speed of the transmission member 56 of the differential transmission corresponds to the ratio between the gear 58 and the teeth 57 on the casing 56 and is $n_{57}=7/8.n_{an}$. The difference between the rotary speeds of internal gear 23 and transmission member 56 can be expressed as follows:

$$D_n=(+5/3-7/8).n_{an}=19/24n_{an}=0.792.n_{an}$$

The rotary speed of the internal gear 39 of the second unit can be determined by Equation 2 when the rotary speed of the planetary gears 46 and 32 for the driven shaft at a standstill are used.

$$n_{46}=n_{32}=-0.75n_{an}$$

$$n_{46}=n_{25} \cdot \left(1-\frac{r_{38}}{r_{46}}\right)+n_{38} \cdot \frac{r_{38}}{r_{46}}$$

Assuming a ratio of the radii of the pitch circles $$\frac{r_{38}}{r_{46}}=6.0$$

it follows $0.75.n_{an}=0.25.n_{an}.(1-6.0)$
$+6.0.n_{38(39)}n_{38(39)}=0.0834.n_{an}$ which corresponds to the conditions illustrated in FIG. 16.

This value corresponds to the rotary speed which can be obtained from the rotary speed of the internal gear 23 when the value of the rotary speed of the transmission member 56 is deducted, and corresponding to the ratio of the worm screws and worm wheels 52, 54, 55, 59, 60, 61, 62, the difference is deducted from the rotary speed of the transmission member 56.

$$n_{39}=(7/8-19/24).n_{an}=1/12n_{an}=0.0834.n_{an}$$

in the event that the rotary speed of the driven shaft is equal to the rotary speed of the drive shaft, which may be expressed as $n_{an}=n_{ab}$, the rotary speed of the planetary gears $n_{11}$ can be determined for the first epicyclic unit from Equation 1 as:

$$n_{11}=n_{an}.(1.0+2.0)-2.0.n_{an}$$

from which follows $\underline{n_{11}=n_{an}}$ which corresponds to the conditions illustrated in FIG' 16b.

$$\frac{r_{12}}{r_{11}}=2$$

From the value of $n_{11}$ and using the Equation 2, the rotary speed of the internal gear 23 can be determined. Assuming a pitch circle ratio of 3.0:

$$n_{11}=n_{an}=n_{an}.(1-3.0)+3.0.n_{23}$$

$\underline{n_{23}=n_{an}}$ corresponding to the conditions illustrated in FIG. 16.

A difference between the rotary speeds of the internal gear 23 and the transmission member 56 for $n_{an}=n_{ab}$ is:

$$D_n=(8/8-7/8).n_{an}=0.125n_{an}=1/8n_{an}$$

The internal gear 39 moves slower than the transmission member 56 corresponding to this difference from which follows that $$n_{39}=(7/8-1/8).n_{an}=3/4n_{an}=\underline{0.75n_{an}}$$

In the second epicyclic unit, $n_{25}=0.25n_{an}$ so that from Equation 2 follows:

$$\underline{n_{32}}=0.25.n_{an}.(1-4.0)+4.0n_{an}=\underline{3.25n_{an}}$$

corresponding to the conditions illustrated in FIG. 16c. The ratio of the radii of the pitch circles is $$\frac{r_{37}}{r_{32}}=4.0$$

In the event that the driven shaft rotates at a quarter of the rotary speed of a drive shaft, the rotary speed of the planetary gears 11 can be determined for the first unit from the Equation 1 assuming a ratio between the radii of the pitch circles of 2.0

$$n_{11}=n_{an}.(1+2.0)-2.0.0.25n_{an}$$

$n_{11}=2.5n_{an}$ corresponding to the conditions illustrated in FIG. 16b. The rotary speed of the internal gear 23 can be determined from Equation 2 assuming a ratio of the radii of the pitch circles $$\frac{r_{23}}{r_{18}}=3.0$$

$$n_{18}=n_{11}=2.5n_{an}=n_{an}\cdot(1-3.0)+3.0\cdot n_{23}$$

$\underline{n_{23}=1.5n_{an}}$ corresponding to the conditions illustrated in FIG. 16.

The difference between the rotary speeds of the internal gear 23 and of the transmission member 56 is $$n_{ab}=0.25n_{an}$$
$$D_n=(12/8-7/8)n_{an}=5/8n_{an}=0.625n_{an}$$

corresponding to the conditions illustrated in FIG. 16. Corresponding to this difference, internal gear 39 must turn slower than transmission member 56 which can be expressed as follows:

$$n_{39}=(7/8-5/8)n_{an}=0.25n_{an}$$

corresponding to the conditions illustrated in FIG. 16.

In the event that the rotary speed of the driven shaft is one quarter of the rotary speed of the drive shaft, the rotary speed of the planetary gears in the second epicyclic unit can be determined from Equation 2 as assuming a ratio of the radii of the pitch circles of $$\frac{r_{36}}{r_{35}}=4.0$$

$$n_{32}=0.25n_{an}(1-4.0)+4.0\cdot 0.25n_{an}=\underline{0.25n_{an}}$$

corresponding to the conditions illustrated in FIG. 16c. The rotary speed of the internal gear 39 can be determined by substitution of $n_{46}=n_{32}$ and assuming the ratio of the radii of the pitch circles of $$\frac{r_{39}}{r_{46}}=6.0$$

$$0.25n_{an}=0.25n_{an}\cdot(1-6.0)+6.0\cdot n_{39}$$

$n_{39}=0.25n_{an}$ corresponding to the conditions illustrated in FIG. 16.

FIG. 16a shows the linear function of the rotary speed $n_{ab}$ of the drive shaft. FIG. 16c shows that when the ratio of transmission 1:4 is exceeded, the planetary gears 32 and 46 reverse their direction of rotation relative to carrier 25 as standstill of the driven shaft is approached. This is shown in broken lines in FIGS. 16b and 16c, while in the second unit the conditions illustrated in FIGS. 10a and 7a prevail.

From the preceding calculations follows that the transmission of the present invention will start from standstill of the driven shaft and will then automatically and continuously, and in accordance with the output of the drive motor, adjust to an output torque and speed of the driven shaft corresponding to the load torque acting on the driven shaft.

In FIG. 10, the radius of the pitch circle 38 of internal gear 39 is indicated by reference numeral 93, and the radius of the pitch circles of the planetary gears 46 is indicated by reference numeral 94. In FIG. 11, the radius $r_{37}$ of the pitch circle of internal gear 37 is indicated by reference numeral 95, and the radius $r_{32}$ of the pitch circle of planetary gear 32 is indicated by reference numeral 95.

The pressure of the dog couplings rises and drops in accordance with a harmonic function, but is smoothed by the inertia and flywheel action of the large internal gears 23, 39, 37 and transmission member 56 so that a substantially unit form force is transmitted through the differential transmission and internal gear 39 to the planetary gears 46 and effects movement of the centrifugal weight 31 contrary to the direction of the centrifugal force, while on the other hand the internal gear 37 and planetary gear 12 transmit this force as driving force to the driven shaft 2.

In the event that the transmission of the present invention is used for a vehicle, the motor driving the drive shaft 1 can be used for braking, when the driven shaft 2 drives the drive shaft 1 in the original direction of rotation. The switch from driving to braking takes place automatically, since the planetary shafts 8 and 30 perform part of a revolution relative to the associated planetary gears 11, 18 and 32, 46 so that the coupling projections 13, 14 and 19, 20 and 33, 34 and 40, 41, respectively abut with the opposite faces. The gears which are fixedly secured to the driven shaft, namely internal gear 37, and spur gear 12, drive the associated planetary gears 32 and 11 and through the same the gear carriers 25 and 5.

In the range of transmission ratios between 1:1 and 1:4, the driven shaft 2, and the internal gear 37, respectively, transmits the tooth pressure 45 to the planetary gear 32 which on the other hand transmits the force 47 through the coupling projection 33, 34 to the shaft 30.

The pressure 47 results in a force 44 on the carrier means 25 and simultaneously drives the planetary shaft 30 in counterclockwise direction. Consequently, the centrifugal weights 31 are moved contrary to the effect of the centrifugal force F in inward direction so that energy is stored. During the following operational phase in which they move in outward direction corresponding to the action of the centrifugal force the centrifugal weights act through coupling projections 41, 40 to exert pressure 42 on the planetary gear 46 which exerts the fourth force 43 on the teeth of the internal gear 39.

The internal gear 39 drives through the intermediate differential transmission 53, 55, 61, 59, 54 and 52, the internal gear 23 of the first epicyclic unit so that the planetary gear 18 is rotated.

Finally, planetary gear 18 drives through coupling projections 19, 20 the planetary shaft means 8 so that the centrifugal weights 9 are moved opposite to the direction of the centrifugal force F in inward direction, and are capable during the following motion phase when moving in direction of the centrifugal force F in outward direction, to resist the drive through the sun gear 12 so that a force is exerted on the planetary gear 11 and through the same and planetary shaft 8 on the carrier means 5.

The drive shaft 1 is consequently driven through the first epicyclic unit from the driven shaft 2, which corresponds to a braking action of the motor on the vehicle.

In the event that the driven shaft turns faster than the drive shaft, the rotary speed of the planetary carrier 5 is smaller than the rotary speed of the driven shaft 2, and consequently the planetary gear 11 turns in clockwise direction, if the driven shaft 2, the sun gear 12, and the planetary carrier 5 turn in counterclockwise direction.

In this case, the same conditions prevail in the first epicyclic unit as previously in the second epicyclic unit, since the drive of the sun gear 12 by the planetary gears 11 takes place during an operational phase in which the centrifugal weights move in outward direction.

Due to the action of the centrifugal force, the coupling projection 13 of planetary shaft 8 exerts a pressure on the coupling projection 14 of the planetary gear 11 acting in clockwise direction, which through the teeth of the planetary gear 11 exerts a force in counterclockwise direction on the sun gear 12 so that the planetary gear carrier 5, which is driven by the drive shaft in counterclockwise direction, drives the sun gear 12 and the driven shaft 2.

In the following operational phase in which the centrifugal weights move in inward direction opposite to the centrifugal force F, the centrifugal weights must be driven from the intermediate differential transimission, as previously described with reference to a second epicyclic unit.

This is effected by the internal gear 33, which is driven from the intermediate differential transmission, and turns in clockwise direction to drive the planetary gears 18 in clockwise direction.

The planetary gears 18 exert through the coupling projections 20 a force on the coupling projection 19 of the planetary shafts 8 so that the planetary shafts 8 are turned in clockwise direction, and the centrifugal weights move in inward direction and store energy. During the following operational phase, the centrifugal weights are capable to drive the sun gear 12 which is fixed on the driven shaft 2.

This operational phase, when the rotary speed of the driven shaft is greater than the rotary speed of the drive shaft, the intermediate differential transmission drives the centrifugal weights 9 and 31 of both epicyclic units to move opposite to the effect of the centrifugal force in inward direction, and receives the energy required for this operation and directly from the drive shaft 1.

The intermediate differential transmission only effects an equalization of the rotary speeds of the internal gears 23 and 39, which are different, and this operation must take place, since the worm screw 55, which has a small pitch angle, does not permit a deviation from a predetermined rotary speed in the differential transmission.

The modified embodiment shown in FIG. 18 operates on the same principle as the embodiment shown in FIG. 1. However, in the embodiment of FIG. 1, a drive motor is connected to the flange shown on the left end of drive shaft 1, whereas in the embodiment of FIG. 18, the drive motor 106 is arranged coaxial with the driven shaft 2. Consequently, the drive shaft 104 which is driven by the motor 106 is also coaxial with the driven shaft 2.

The transmission includes a first epicyclic unit shown on the left of FIG. 18, a second epicyclic unit shown on the right of FIG. 18, and an intermediate differential transmission connecting the two units. The first epicyclic unit has a planetary carrier means 5' which is constructed as a casing enveloping the centrifugal weight means 9' which are formed as one piece including two legs and a transverse body. A gear crown 4' is fixed on a portion of carrier casing 5' and meshes with the gear 3 which is secured to an auxiliary shaft 113 corresponding to shaft 1 in the construction of FIG. 1. Another gear 58 is also fixed on shaft 113, and meshes with the gear teeth on the casing 56 of the intermediate differential transmission. A third gear 26 is fixed to shaft 113 and meshes with a gear crown 114 provided on the carrier means 25' of the second epicyclic unit. Carrier means 25' is also constructed as a casing housing the centrifugal weight means 31'. The planetary gear 46' has an extended axle-like portion 30' which is turnably mounted in bearings 108. The centrifugal weight means 31' are mounted on bearings 109 on the extension 30' of planetary gear 46 and are rotatable on the same. Centrifugal weight means 31' have shaft portions 131, 115 which are turnably mounted in carrier means 25' in bearings 110. Consequently this shaft portion 131, 115 corresponds to the planetary shaft means 30 described with reference to FIG. 1, and it will be noted that the planetary gear means 46', 30' and the planetary gear means 32 are freely rotatable relative to the planetary shaft means 131, 115. A dog coupling 34, 33 connects planetary shaft 131 with gear 32 in the same manner as described with reference to FIG. 1. Another dog coupling connects the planetary shaft means 131 and the centrifugal weight means 31' with the planetary gear 46', 30'. The second dog coupling includes a projection 40' on the planetary gear means 46', 30' and a projection 41' on the centrifugal weight means 31' which rotates with the planetary shaft 131. It is therefore apparent that the operation of the two dog couplings of the second epicyclic unit shown in 23 corresponds to the operation of the dog couplings described with reference to FIG. 1 the only difference being that the planetary gear means 46' has an extended portion 30' which is coupled to the centrifugal weight means 31' which is actually part of the planetary shaft means 131.

The motor shaft 104 is fixedly connected to a hub portion 105 of the planetary carrier means 5'. Consequently rotation of the motor will effect rotation of the planetary carrier 5' in the same manner as rotation of shaft 1 in FIG. 1 effects rotation of the planetary carrier 5 through gear means 3, 4.

Since the gear crown 4' on the planetary carrier 5' in FIG. 18 meshes with a gear 3, the auxiliary shaft 113 is operatively connected to the drive shaft 104 and driven from the same. Consequently as regards the operation, the effect of the auxiliary shaft 113, and in its three gears 3, 58 and 26 is the same as the effect of the drive shaft 1 in the construction of FIG. 1. However, the modified arrangement of FIG. 18 has the driven shaft arranged coaxial with the motor 106 which has advantages when the transmission is used in a motor car.

The transmission ratio between the gear 3 and the gear crown 4', the transmission ratio between the gear 58 and the gear crown 57, and the transmission ratio between the gear 26 and the gear crown 114 on the flange 107 of the planetary gear means 25' are selected so that the transmission member 56, 57 of the differential transmission rotates at seven eighths of the rotary speed of drive shaft 104, and so that the planetary carrier means 25' is driven at one fourth of the rotary speed of the drive shaft 104. Evidently, the transmission ratio between the drive shaft 104 and the carrier means 5' is 1:1, since the two elements are directly coupled. The operation of the embodiment shown in FIG. 18 corresponds to the operation described with reference to FIG. 1.

Figure 19:
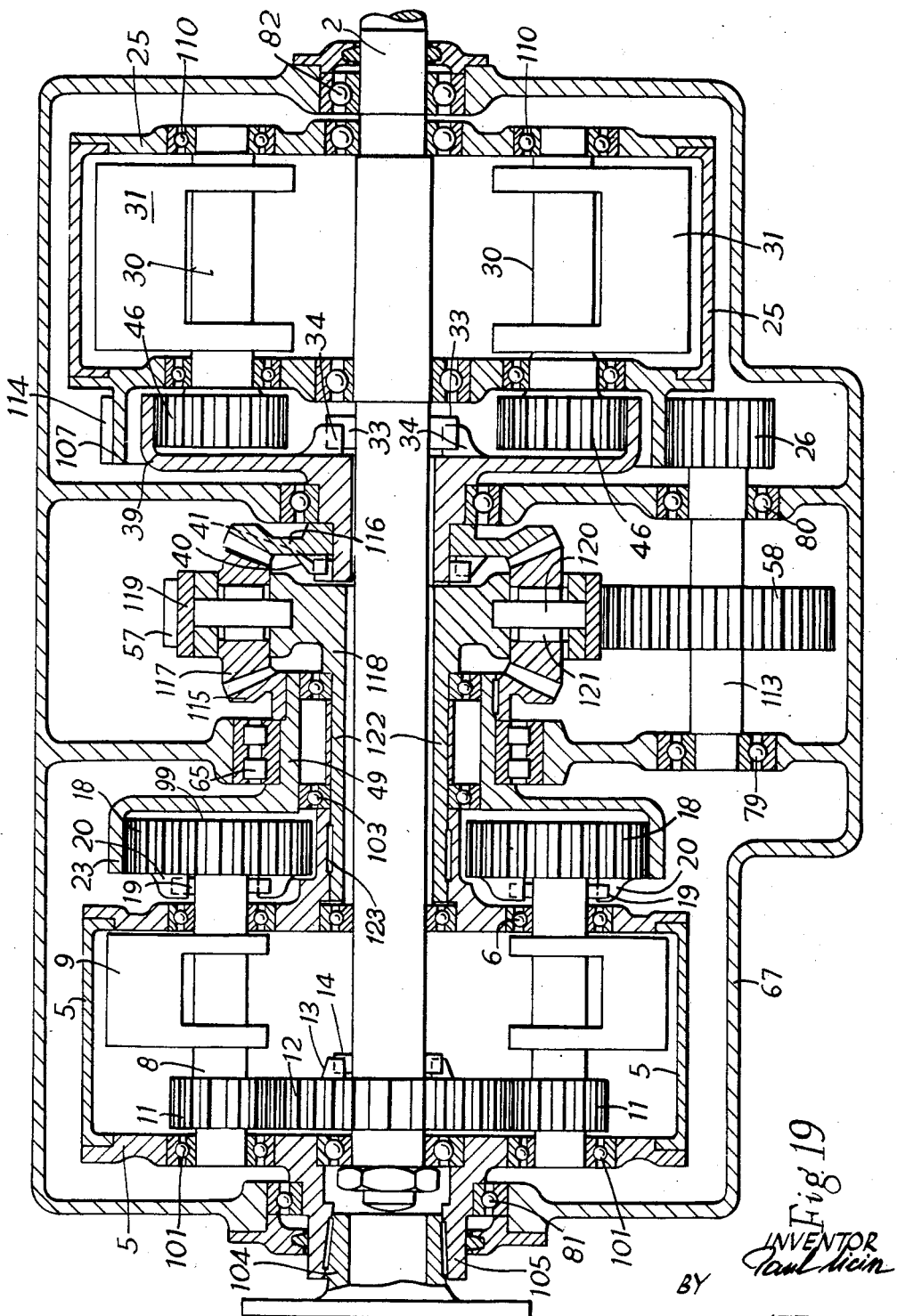
FIG. 19 is an axial sectional view illustrating an infinitely variable mechanical transmission according to another embodiment of the present invention.

The third example of design shown in FIG. 19 means some simplification with respect to the former design. This simplification has been obtained by taking a ratio of 1 to 3 in the planetary gear 11, 12 of the epicyclic gear unit of 1:1 and a ratio of 1 to 4 between the gear 39 and the planetary gear 46 of the 1:4 unit.

With these proportions and by application of the formulae and numerical computations given on cols. 7, 8 and 9 the gear 39 will run always with the same speed as the driven shaft 2; as a result, the second pair of planetary gears of group—unit—1:4, i.e. the gear 37 and the planetary gears 32, may be cancelled.

There is also a difference in the disposition of the one-way couplings in comparison with the former design. In the 1:4 unit the one-way couplings 33, 34 are placed between the driven shaft and the gear 39, and also the one-way couplings 40, 41 between the gear 39 and the bevel gear 116 of the differential transmission.

Following the same principle, in the unit 1:1 the one-way coupling 13, 14 is placed between the gear 12 and the driven shaft 2. In this way it has been possible to make the planetary gears 11 and 46 solidary with the planetary shafts 8 and 30. Only the planetary gears 18 are located in the bearings 99 on the shaft 8 carrying the centrifugal planetary weights.

Further simplification is obtained by the fact that the planetary carrier 118 and the differential transmission run at the same speed as the driving shaft. Therefore, this planetary carrier may be attached immediately to the carrier 5 of the 1:1 unit. This rigid connection is obtained through the hollow shaft 122.

The differential transmission is composed of two bevel gears 115 and 116, meshing with the planetary bevel gears 117, located in the planetary carrier 118.

As in the former design, planetary carrier has a toothed rim 57, meshing with the gear 58, which drives the gear 26 of the 1:4 unit.

It will be understood that each of the elements described above, or two or more together, may also find a useful application in other types of automatic transmissions differing from the types described above.

While the invention has been illustrated and described as embodied in an infinitely variable mechanical torque converter employing centrifugal weights, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Infinitely variable mechanical torque converter comprising, in combination, a drive shaft; a driven shaft; a first epicyclic gear unit, and a second epicyclic gear unit, each of said units driven with different rotational speed from said drive shaft and each of said units including a first gear fixed on said driven shaft, a second gear free rotating with regard to drive shaft, rotary planetary carrier means operatively connected to and driven from said drive shaft, planetary shaft means turnably mounted on said carrier means (for rotation) and including centrifugal weight means exerting a turning moment on said planetary shaft means during rotation of said planetary carrier, two planetary gears turnably mounted on said planetary shaft means and respectively meshing with said first gear connected to said driven shaft and with said second gear free rotating with regard to driven shaft, and two one-way coupling means for coupling said shaft means to said planetary means respectively for transmitting turning force only in one direction; and differential transmission means operatively connecting said second gear of said first unit to said second gear of said second unit and including a planetary carrier member operatively connected to said drive shaft and driven from the same, all transmission ratios in said epicyclic gear units and in said differential transmission gear means connecting the two units being such that the projection of each of these couplings in said units generally remain permanently contacted in any transmission ratio between drive shaft and driven shaft, so that the driving impulse of the centrifugal weight means is transmitted on to the driven shaft, whereas the braking impulse of contrary direction is diverted from the driven shaft, and over the differential transmission means either transmitted on to the other epicyclic unit in order to reconvey its centrifugal weight means into initial position, or to reconduct the energy into the driven shaft, so that the moment of rotation is varied in accordance with a load torque acting on the driven shaft.

2. A torque converter as set forth in claim 1, wherein said first gear of said first epicyclic unit fixed to driven shaft is a spur gear; and wherein said second gear of said first unit, free rotating with regard to driven shaft, is an internal orbit gear; and said second gear free rotating with regard to driven shaft and said first gear fixed to the driven shaft of said second epicyclic unit are internal orbit gears, the transmission ratios in all these parts being such that said projection of the individual coupling means remain premanently contacted during rotation.

3. A torque converter as set forth in claim 1, wherein first, second and third transmission elements drivingly connect said driving shaft with said planetary carrier means of said first epicyclic unit, with said planetary carrier member of said differential transmission means, and with said carrier means of said second epicyclic unit, said transmission elements for the said first and second units having different ratios.

4. A torque converter as set forth in claim 1, wherein said coupling means are one-way dog couplings, of the two couplings belonging to one planetary shaft, one coupling being operative for one turning direction, and the other coupling being operative for the opposite direction, each one-way dog coupling including a coupling projection connected to one of said planetary gears for rotation, and a coupling projection connected to the respective planetary shaft means for rotation, the coupling projections of each one-way dog coupling normally abutting each other without interruption.

5. A torque converter as set forth in claim 1, wherein said differential transmission means includes first and second worm wheels respectively connected to said second gear of said first unit and to said second gear of said second unit for rotation; first and second worm screws turnably mounted on said planetary carrier member and respectively meshing with said first and second worm wheels; and gear means connecting said first and second worm screws for rotation, wherein the first of said worm screws should be with large lead and reversible, and the second of said worm screws should be of small pitch angle and non-reversible, so that said first worm wheel could drive said reversible worm screw and by means of said gear means could turn said non-reversible, self-locking worm, and thus, through the second worm wheel, can transmit the driving force from said first to said second unit, but that, in the opposite direction, a turning force emerging from said second unit can be supported by said non-reversible worm gear, without causing it to turn and without transferring a turning movement on to said first unit.

6. A torque converter as set forth in claim 5, wherein said first and second worm screws have different pitch angles, and wherein said gear means connecting said worm screws have such a ratio and are arranged in such a manner that said worm screws turn said first and second worm wheels with regard to said planetary carrier member at the same rotary speed but in opposite directions.

7. A torque converter as set forth in claim 5, wherein said first and second worm screws are connected by said gear means to turn in the same direction, and wherein one of said worm screws has a right-handed thread and the other of said worm screws has a left-handed thread.

8. A torque converter as set forth in claim 7, wherein said planetary carrier member is a casing housing said worm wheels, said worm screws and said connecting gear means.

9. Infinitely variable mechanical torque converter comprising, in combination, a drive shaft; a driven shaft; a first epicyclic gear unit, and a second epicyclic gear unit, each of said units driven with different rotational speed from said drive shaft, the first unit including a first sun gear and coupling means including at least one coupling projection on said sun-gear means, and at least one coupling projection on said driven shaft, for coupling said sun-gear means to said driven shaft by means of a one-way coupling, a second internal gear, rotary planetary carrier means coaxial with, operatively connected to and driven from said drive shaft, planetary shaft means mounted on said carrier means for rotation and including centrifugal weight means exerting a turning moment on said planetary shaft means during rotation of said carrier, two planetary gears turnably mounted on said planetary shaft means and respectively meshing with said first sun gear and second internal gear, and one coupling means for coupling said shaft means to the second planetary gear by means of a one-way coupling; the second epicyclic gear unit including one internal gear and coupling means including at least one coupling projection on said internal gear, and at least one coupling projection on said driven shaft, for coupling said internal gear to said shaft by means of a one-way coupling, rotary planetary carrier means coaxial with, operatively connected to and driven from the differential transmission as mentioned below, planetary shaft means mounted on said carrier means for rotation and including centrifugal weight means exerting a turning moment on said planetary shaft means during rotation of said carrier, one planetary gear fixed on said planetary shaft means and meshing with said internal gear; differential transmission means operatively connecting said second internal gear of said first unit to said internal gear of said second unit and including a rotary transmission member rigidly connected to the planetary carrier of the first epicyclic gear unit, the latter being immediately driven by the drive shaft; and auxiliary shaft; and first and second transmission elements respectively drivingly connecting said auxiliary shaft with the rotary transmission member of said differential transmission, and with said carrier means of said second epicyclic gear unit, the two said transmission elements having different ratios, so that the torque transmitted from said drive shaft to said driven shaft is varied in accordance with a load torque acting on the driven shaft and so that potential energy is stored in said centrifugal weight means during movement of the same opposite to the direction of the action of the centrifugal force, and so that kinetic energy is released during movement of said centrifugal weight means in the direction of the centrifugal force.

10. A torque converter as set forth in claim 9, wherein that gear of the differential transmission which is nearest to the second epicyclic gear unit is connected with the said gear of said second unit by a one-way coupling.

11. Infinitely variable mechanical torque converter comprising, in combination, a drive shaft; a driven shaft; a first epicyclic gear unit, and a second epicyclic gear unit, each unit including gear means, rotary planetary carrier means operatively connected to and driven from said drive shaft, planetary shaft means mounted on said carrier means for rotation and including centrifugal weight means exerting a turning moment on said planetary shaft means during rotation of said carrier, and one-way couplings for drivingly connecting the planetary shafts bearing the centrifugal weights through said gear means to the driven shaft, and, on the other hand, one-way couplings for drivingly connecting the planetary shafts bearing the centrifugal weights through said gear means to a differential transmission, the transformation ratios in all transmission gears as well as in both said planetary units, in differential transmission and in the reduction gears between those three parts being so disposed that generally the projections of each of these couplings are permanently attached to each other without interruption, and without carrying out relative motion.

References Cited by the Examiner
UNITED STATES PATENTS 1,957,578   5/34   Cook ---------------- 74—752 X
2,512,050   6/50   Ash ----------------- 74—715 X

FOREIGN PATENTS 1,069,518   7/54   France.

DON A. WAITE, *Primary Examiner.*

BROUGHTON G. DURHAM, SAMUEL SPINTMAN,
*Examiners.*